United States Patent [19]

LeGrand et al.

[11] 4,446,464
[45] May 1, 1984

[54] AIRBORNE TACAN EQUIPMENT UTILIZING A LOGARITHMIC AMPLIFIER

[75] Inventors: Jesse S. LeGrand, Titusville, Fla.; William Fockler, Wayne; Mairice L. J. Jezo, Cedar Grove, both of N.J.

[73] Assignee: International Telephone and Telegraph Corporation, New York, N.Y.

[21] Appl. No.: 310,347

[22] Filed: Oct. 13, 1981

[51] Int. Cl.³ .............................................. G01S 1/44
[52] U.S. Cl. ..................................... 343/399; 364/451
[58] Field of Search ........................... 343/106 R, 399; 364/451

[56] References Cited

U.S. PATENT DOCUMENTS 3,940,763 2/1976 Paradise .......................... 343/106 R Primary Examiner—Theodore M. Blum
Attorney, Agent, or Firm—John T. O'Halloran; Alfred C. Hill

[57] ABSTRACT

Airborne Tacan equipment includes a receiver to receive Tacan signals and to provide an output signal having modulation components containing bearing information. The receiver includes a logarithmic amplifier to preserve the amplitude modulation of the modulation components and to enable operation on input signals having large amplitude variations. An arrangement is coupled to the receiver to at least partially compensate for the non-linearity of the logarithmic amplifier prior to extraction of the bearing information.

9 Claims, 4 Drawing Figures

AIRBORNE TACAN EQUIPMENT UTILIZING A LOGARITHMIC AMPLIFIER

BACKGROUND OF THE INVENTION

The present invention relates to airborne Tacan equipment and more particularly to improved airborne Tacan equipment.

The concept and operational characteristics of Tacan systems are well known. A detailed description may be found in MIL STD 291B. Basically, the Tacan system allows an aircraft to determine its position relative to a Tacan ground beacon. Basically, Tacan is a radio aerial navigation system of the polar-coordinate type wherein there is a bearing facility that provides on the aircraft a meter indication of its direction in degrees of bearing from a ground beacon selected by the pilot. Also, there is a distance facility that provides on the aircraft a meter indication in nautical miles of its distance from the selected ground beacon. Knowing the bearing and distance from a specific geographic point (the selected ground beacon), the pilot can fix his position on a chart.

The bearing information is extracted from phase measurements, and, therefore, it is necessary to have a fixed frequency of the same frequency that is received in all directions from the beacon with identical phase. As a convenient standard, as defined in MIL STD 291B, the phase of the reference wave is adjusted so that it is transmitted at the same instant of time that the maximum of the rotating cardioid lobe pattern aims east. In any case, the airborne electrical phase difference measurement would numerically represent the aircraft's geographic bearing, which is conventionally measured clockwise from north. Actually, any other standard adjustment for the reference wave might be adopted. The airborne phase measuring circuits would simply be zero-calibrated accordingly. The north reference group of pulses furnishes suitable reference for measuring the phase of the 15 cycle component of the envelope wave.

To furnish a suitable reference for measuring the phase of a 135 cycle component of the envelope wave, the ground equipment transmits appropriately timed encoded reference signals similar to the north reference group of signals. These secondary reference signals are referred to as auxiliary reference pulse groups. In one rotation of the beacon antenna, eight of these groups are transmitted, separated by 40° of rotation. The ninth position is occupied by the north reference signal group.

In airborne Tacan equipment, amplifiers are used to bring the amplitude of the Tacan pulses to a level sufficient for extraction of bearing information and must be such as to (1) preserve amplitude modulation of the pulse train or modulation components which carry the bearing information; and (2) accept input signal variations of large amplitudes of approximately 90 dB (decibel).

These two requirements are usually satisfied by a linear amplitude of limited linear range of approximately 12 to 15 dB with automatic gain control (AGC).

There are two major drawbacks to the utilization of this type of amplifier. The AGC controlled loop adds complexity to the amplifier and the time constants of the AGC loop are a compromise. The time constants must be chosen to preserve the 15 Hz (Hertz) modulation component of the received signal and to respond to rapid signal variations.

SUMMARY OF THE INVENTION

An object of the present invention is to provide airborne Tacan equipment which overcomes the above-mentioned disadvantages.

Another object of the present invention is to provide a logarithmic amplifier in the place of the linear amplifier of limited linear range with AGC.

Still another object of the present invention is to provide airborne Tacan equipment utilizing logarithmic amplifiers which alleviate the need for AGC loop and is simpler than or at least as simple as a linear amplifier of limited linear range.

A further object of the present invention is to provide airborne Tacan equipment employing logarithmic amplifiers to improve the operation of this equipment since a signal of variable strength does not suffer additional distortion in the logarithmic amplifier.

Still a further object of the present invention is to provide airborne Tacan equipment utilizing logarithmic amplifiers with a simple modification of the bearing information abstracting circuits to accept the logarithmic input from the logarithmic amplifier.

A feature of the present invention is the provision of airborne Tacan equipment comprising first means to receive Tacan signals and to provide an output signal containing modulation components carrying bearing information, the first means including a first logarithmic amplifier to preserve amplitude modulation of the modulation components and to enable operation on input signals having large amplitude variations; and second means coupled to the first means to at least partially compensate for the non-linearity of the logarithmic amplifier prior to extraction of the bearing information.

BRIEF DESCRIPTION OF THE DRAWING

Above-mentioned and other objects and features of the present invention will become more apparent by reference to the following description taken in conjunction with the accompanying drawing, in which.

DESCRIPTION OF THE PREFERRED EMBODIMENT

Figure 1:
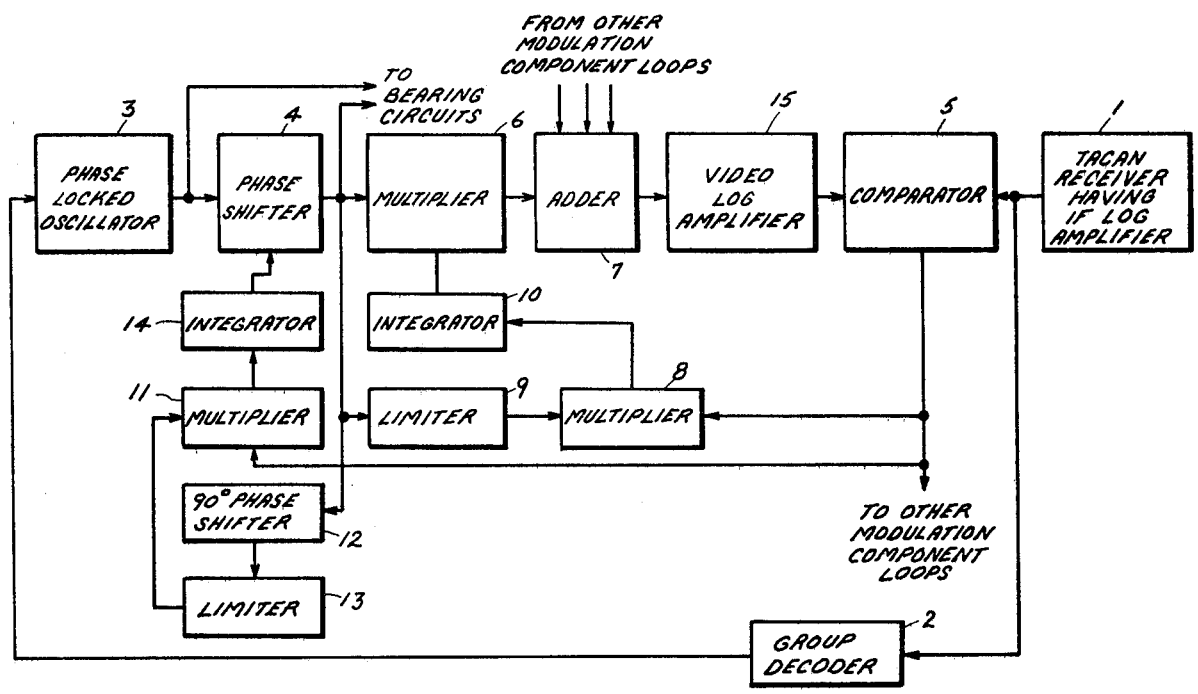
FIG. 1 is a block diagram of one embodiment of the airborne Tacan equipment employing logarithmic amplifiers in accordance with the principles of the present invention.

Referring to FIG. 1, there is illustrated therein a block diagram of an airborne Tacan equipment for extracting antenna modulation components in order to determine bearing. This apparatus is basically that disclosed in U.S. Pat. No. 3,836,864, whose disclosure is incorporated herein by reference. In accordance with the principles of the present invention, the Tacan receiver 1 includes therein an IF (intermediate frequency) logarithmic amplifier so that the amplitude modulation of the pulse train which carries the bearing information is preserved and so that large amplitude input signal variations can be accepted. The output signal of receiver 1 is coupled to a group decoder 2 which separates the north reference group of pulses and applies them to phase locked oscillator 3. Oscillator 3 is triggered at its zero point by a group of pulses at the output of decoder 2. Group decoder 2 may, for instance, be realized by a circuit similar to that disclosed in the book "Electronic Avigation Engineering", by Peter C. Sandretto, 1958, pages 550 and 551, and FIGS. 12-29. The output signal of oscillator 3 is coupled to phase shifter 4 which shifts the applied signal in the direction of coincidence with the envelope of the output signal from receiver 1. The output of oscillator 3 and the output of phase shifter 4 is applied to the bearing determination circuitry, typically a phase meter.

The output signal of receiver 1 is also applied to a comparator 5 which compares the output signal of receiver 1 both in amplitude and phase to the locally generated signal. Comparator 5 produces an error signal which will ultimately be used to modify the amplitude and phase of the local signal at the output of oscillator 3 in the direction of coincidence with the envelope of the output signal of receiver 1. It should be clear that the error signal consists of samples determined by subtracting the envelope of the output signal of receiver 1 from the phase shifted locally generated signals at the output of oscillator 3.

The amplitude of the phase shifted signal at the output of phase shifter 4 is modified by multiplier 6 whose output is combined with the corrections due to other components of modulation. This combination occurs in adder 7. It should be clear that the block diagram shown in FIG. 1 processes only one component of the modulation, for instance, the 15 cycle Tacan modulation component. Corrections required due to other modulation components and harmonics must be arrived at in the same manner in similar circuitry and then combined in adder 7.

The error signal at the output of comparator 5 is multiplied in multiplier 8 by the locally generated phase shifted signal at the output of limiter 9 which is coupled to phase shifter 4. The correction signal produced at the output of multiplier 8 is such as to bring about an increase in peak amplitude. This signal is integrated in integrator 10 and applied to multiplier 6. The amplitude of the waveform produced by multiplier 6 is intended to coincide with the amplitude of the envelope of the output signal of receiver 1.

The error signal is also applied to multiplier 11 as is the locally generated phase shift signal at the output of phase shifter 4 shifted in phase by 90° in phase shifter 12 whose output is limited by limited 13. The samples of the output of multiplier 11 after being integrated in integrator 14 have an average negative value having a tendency to decrease the phase of the locally generated signal thereby shifting the phase in the direction of the envelope of the output signal receiver 1.

To at least partially compensate for the non-linearity of the logarithmic amplifier in receiver 1, a video log amplifier 15 is disposed in the control loop between the output of adder 7 and the input of comparator 5.

The logarithmic amplifier of receiver 1 and logarithmic amplifier 15 are devices that produce an output approximately proportional to the logarithm of the input signal, output = K log (A + input), where K and A are constants. There are several ways of implementing logarithmic amplifiers, namely, successive detection and feedback around each stage.

The waveforms at the various locations in the circuit of FIG. 1 are clearly illustrated in the above-cited patent and need not be illustrated herein again but, as mentioned hereinabove, are incorporated herein by reference.

When the technique of FIG. 1 is implemented by a digital computer, the computer may be modified to enable the utilization of an IF (intermediate frequency) logarithmic amplifier in receiver 1 in three different ways which will be disclosed hereinbelow.

Figure 2:
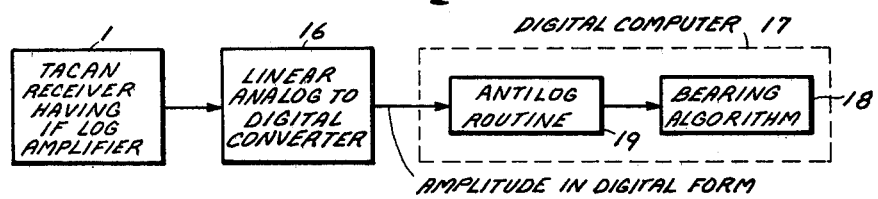
FIG. 2 is a block diagram of a second embodiment of airborne Tacan equipment employing a logarithmic amplifier in accordance with the principles of the present invention.

FIG. 2 shows one embodiment employing a digital computer with the output of receiver 1 being connected to a linear analog-to-digital converter 16 whose digital output containing the bearing information in digital format is connected to the digital computer 17 which, besides the conventional bearing algorithm 18 contained therein as disclosed in the above-cited patent at column 2, lines 27 to 41, incorporates an antilog routine 19 to which the digital output of converter 16 is subjected to prior to being applied to bearing algorithm 18.

Figure 3:
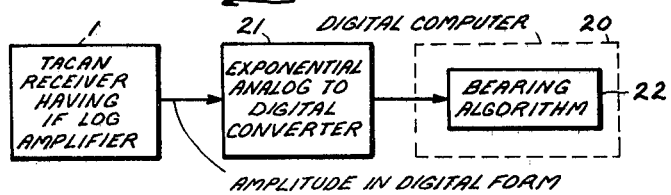
FIG. 3 is a block diagram of a third embodiment of airborne Tacan equipment employing a logarithmic amplifier in accordance with the principles of the present invention.

FIG. 3 illustrates another embodiment employing a digital computer 20. In this embodiment the output of receiver 1 is coupled to an exponential (antilog) analog-to-digital converter 21 whose output in digital form containing the bearing information is coupled directly to the conventional bearing algorithm 22 contained in computer 20. Bearing algorithm 22 is the same as bearing algorithm 18 of FIG. 2.

Figure 4:
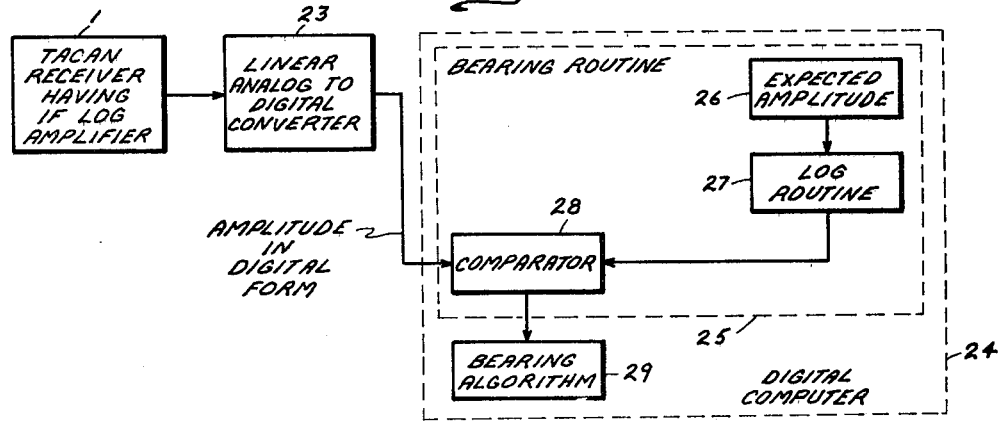
FIG. 4 is a block diagram of a fourth embodiment of airborne Tacan equipment employing a logarithmic amplifier in accordance with the principles of the present invention.

In the embodiment of FIG. 4, the output of receiver 1 is coupled to a linear analog-to-digital converter 23. The digital output of converter 23 containing the bearing information in digital form is coupled to digital computer 24 which includes therein a bearing routine 25 which provides an expected amplitude 26 of the output of receiver 1 in digital form. The expected amplitude 26 is then subjected to a log routine 27 with the output of log routine 27 being compared with the output of converter 23 in comparator 28. The output of comparator 28 then goes to the conventional bearing algorithm 29 to provide the bearing contained in the digital output of converter 23. Bearing algorithm 29 is the same as bearing algorithm 18 of FIG. 2.

It would also be possible to couple the amplitude of each sample processed through a linear analog-to-digital converter directly to a bearing routine of a digital computer designed to accept input from a linear receiver without modification. This, of course, would result in degraded performance under extreme signal level conditions.

While we have described above the principles of our invention in connection with specific apparatus, it is to be clearly understood that this description is made only by way of example and not as a limitation to the scope of our invention as set forth in the objects thereof and in the accompanying claims.

We claim:

1. Airborne Tacan equipment comprising:
   first means to receive Tacan signals and to provide an output signal containing modulation components carrying bearing information, said first means including a first logarithmic amplifier to preserve amplitude modulation of said modulation compenents and to enable operation on input signals having large amplitude variations; and
   second means coupled to said first means to at least partially compensate for the non-linearity of said logarithmic amplifier prior to extraction of said bearing information.

2. Tacan equipment according to claim 1, wherein said second means includes a local oscillator for generating a local signal which is to be made coincident in phase and in amplitude with said output signal, third means coupled to said oscillator and said first means for triggering said oscillator at a predetermined point on said output signal, fourth means coupled to the output of said oscillator and to said first means for comparing said local signal with said output signal and for generating an error signal if said local signal and said output signal are not coincident, phase shifting means coupled to the output of said oscillator, fifth means coupled to the output of said phase shifting means and said fourth means responsive to said error signal for adjusting the amplitude of said local signal in the direction of coincidence with said output signal, a second logarithmic amplifier coupled between said fifth means and said fourth means; and sixth means coupled between said fourth means and said phase shifting means responsive to said error signal to control said phase shifting means.

3. Tacan equipment according to claim 2, wherein said fifth means includes first multiplying means coupled to said fourth means and said phase shifting means for multiplying said error signal by a phase shifted signal at the output of said phase shifting means to obtain an average amplitude correction signal, and second multiplying means coupled between said phase shifting means and said second logarithmic amplifier and to the output of said first multiplexing means for multiplying said phase shifted signal by said amplitude correction signal to alter the amplitude of said signal in the direction of coincidence with said output signal.

4. Tacan equipment according to claim 3, wherein said fifth means further includes an amplitude limiter coupled between the output of said phase shifting means and an input of said first multiplying means, and an integrator having an input coupled to the output of said first multiplying means and an output coupled to an input of said second multiplying means.

5. Tacan equipment according to claims 2, 3 or 4, wherein said sixth means includes a 90° phase shifter having an input coupled to the output of said phase shifting means, and multiplier means having a first input coupled to the output of said 90° phase shifter, a second input coupled to the output of said fourth means to receive said error signal and an output coupled to said phase shifting means for controlling the amount of phase shift provided by said phase shifting means.

6. Tacan equipment according to claim 5, wherein said sixth means further includes an amplitude limiter coupled between the output of said 90° phase shifter and said first input of said multiplier means, and an integrator coupled between the output of said multiplier means and said phase shifting means.

7. Tacan equipment according to claim 1, wherein said second means includes a linear analog-to-digital converter coupled to the output of said first means to convert said output signal to a digital signal, and a digital computer coupled to said converter to provide a bearing from said bearing information contained in said digital signal, said computer having an antilog routine for processing said digital signal prior to obtaining said bearing.

8. Tacan equipment according to claim 1, wherein said second means includes an exponential analog-to-digital converter coupled to the output of said first means to convert said output signal to a digital signal, and a digital computer coupled to said converter to provide a bearing from said digital signal.

9. Tacan equipment according to claim 1, wherein said second means includes a linear analog-to-digital converter coupled to the output of said first means to convert said output signal to a digital signal, and a digital computer coupled to said converter to provide a bearing from said bearing information contained in said digital signal, said computer having a bearing routine for processing said digital signal prior to obtaining said bearing, said bearing routine including a comparator coupled to said converter to compare said digital signal to an expected amplitude signal in digital form after being processed in a log routine.

* * * * *